(No Model.)
J. R. MASSEY.
Horse Power.
No. 234,682. Patented Nov. 23, 1880.
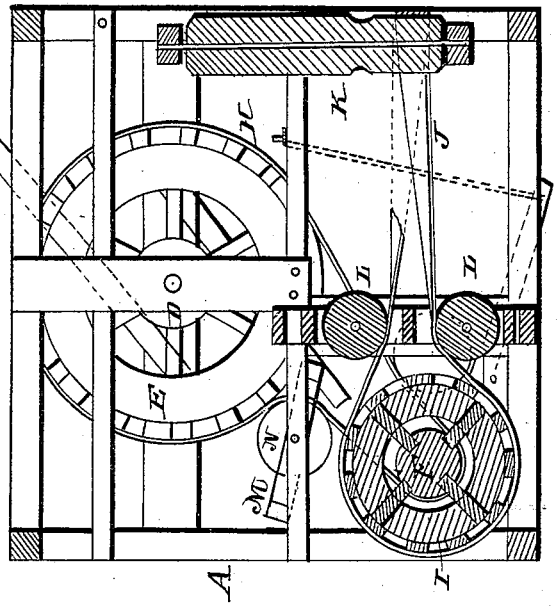
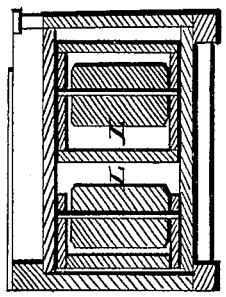
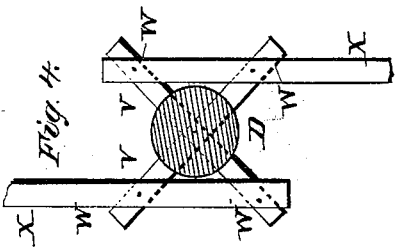
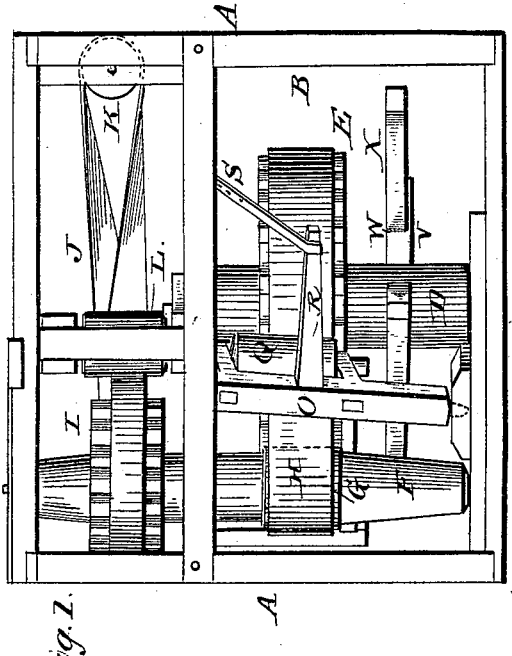
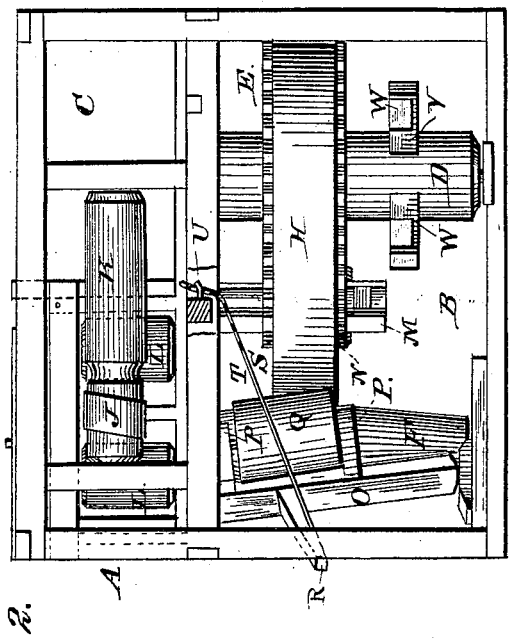
Witnesses
A. H. Krause
F. G. Dieterich
Inventor
J. R. Massey
By his Attorneys
C. A. Snow & Co.

United States Patent Office.

JAMES R. MASSEY, OF ARGO, ALABAMA.

HORSE-POWER.

SPECIFICATION forming part of Letters Patent No. 234,682, dated November 23, 1880.

Application filed March 5, 1880. (No model.)

*To all whom it may concern:*

Be it known that I, JAMES R. MASSEY, of Argo, in the county of Jefferson and State of Alabama, have invented certain new and useful Improvements in Horse-Powers; and I do hereby declare that the following is a full, clear, and exact description of the invention, which will enable others skilled in the art to which it appertains to make and use the same, reference being had to the accompanying drawings, which form a part of this specification, and in which—

Figure 1 is a side view. Fig. 2 is a front view. Fig. 3 is a horizontal sectional view, and Figs. 4 and 5 are details.

Corresponding parts in the several figures are denoted by like letters of reference.

This invention relates to horse-powers; and it consists in certain improvements in the construction of the same, which will be hereinafter more fully described, and particularly pointed out in the claim.

In the drawings hereto annexed, A represents a suitably-constructed frame, provided with a horizontal partition or skeleton-partition, by which it is divided into two compartments, B C, in the lower one of which, B, is arranged a vertical shaft, D, carrying the main wheel E.

F is a vertical shaft, of conical form, with its base upward, and made to serve as a drum, and having its bearings in cross-pieces at the top and base of the frame A, and carrying in the lower compartment a pulley, G, connected by a belt or band, H, with the main wheel E. In the upper compartment, C, of frame A the shaft F is provided with a pulley or drum, I, connected by a twisted belt, J, with a pulley upon a horizontal shaft, K, from which motion may be transmitted in any suitable manner to the machinery to be operated. Vertical guide-pulleys L L are provided, one on each side of the twisted belt J.

M is a frame depending from the horizontal partition in frame A, and provided with bearings for a vertical shaft carrying a friction-pulley, N, bearing against one side of the belt H.

Closely adjoining the other side of said belt is an inclined bar, O, provided with arms P P, having bearings for a pulley, Q, pressing against belt H, and, owing to the inclined position of bar O, tending to force the said belt in an upward direction, thereby preventing it from working down and off the drums during operation.

For the purpose of adjusting the pressure of pulley Q upon belt H, and thus tightening the latter to any desired extent, the bar O is provided with a lever, R, to the end of which is secured a flexible band, S, having a series of perforations, T, by any one of which it may be adjusted upon a suitably-located hook, U.

The vertical main shaft D is provided with spokes V, having oblique mortises W to receive the sweeps X, to which the horses are hitched.

From the foregoing description, taken in connection with the drawings hereto annexed, the operation of my invention will be readily understood by those skilled in the art to which it appertains. It is simple, durable, easily constructed, and, being free from cog-gear of any kind, it may be constructed of wood without the use of metallic castings.

Having thus described my invention, I claim and desire to secure by Letters Patent of the United States—

As an improvement in horse-powers, the combination of the frame A, having horizontal partition, vertical shafts D F, provided with drums, belt H, twisted belt J, horizontal shaft K, guide-pulleys L L, friction-pulley N, inclined bar O, having arms P P, tightening-pulley Q, and levers R, and the adjusting-band S, all arranged and operating substantially as and for the purpose specified.

In testimony that I claim the foregoing as my own I have hereto affixed my signature in presence of two witnesses.

JAMES ROBERT MASSEY.

Witnesses:
 ANDREW FRAZIER,
 A. R. MORROW.